(12) United States Patent
Atago

(10) Patent No.: US 7,343,436 B2
(45) Date of Patent: Mar. 11, 2008

(54) SYNCHRONOUS ELECTRONIC CONTROL SYSTEM AND SYSTEM CONTROL METHOD

(75) Inventor: Kunio Atago, Gyouda (JP)

(73) Assignee: Kabushiki Kaisha Forks, Tokyo (JP)

( * ) Notice: Subject to any disclaimer, the term of this patent is extended or adjusted under 35 U.S.C. 154(b) by 16 days.

(21) Appl. No.: 10/532,103

(22) PCT Filed: Oct. 29, 2002

(86) PCT No.: PCT/JP02/11243

§ 371 (c)(1),
(2), (4) Date: Apr. 21, 2005

(87) PCT Pub. No.: WO2004/040451

PCT Pub. Date: May 13, 2004

(65) Prior Publication Data

US 2006/0041700 A1 Feb. 23, 2006

(51) Int. Cl.
*G06F 13/00* (2006.01)
(52) U.S. Cl. ............... 710/107; 710/300; 710/302; 710/104; 714/11
(58) Field of Classification Search ........ 710/300–317, 710/107–110, 240–244; 714/10–13
See application file for complete search history.

(56) References Cited

U.S. PATENT DOCUMENTS

| | | | | |
|---|---|---|---|---|
| 4,805,106 A | * | 2/1989 | Pfeifer | 710/200 |
| 5,261,109 A | * | 11/1993 | Cadambi et al. | 710/111 |
| 5,500,945 A | * | 3/1996 | Maeda et al. | 714/56 |
| 5,976,112 A | * | 11/1999 | Lyza, Jr. | 604/199 |
| 6,108,732 A | * | 8/2000 | Klein | 710/302 |
| 6,112,271 A | * | 8/2000 | Lanus et al. | 710/306 |
| 6,263,452 B1 | * | 7/2001 | Jewett et al. | 714/9 |
| 6,321,284 B1 | * | 11/2001 | Shinohara et al. | 710/113 |
| 6,463,550 B1 | * | 10/2002 | Cepulis et al. | 714/25 |
| 6,687,851 B1 | * | 2/2004 | Somers et al. | 714/12 |
| 6,883,125 B2 | * | 4/2005 | Abbondanzio et al. | 714/100 |
| 6,931,568 B2 | * | 8/2005 | Abbondanzio et al. | 714/11 |
| 6,950,895 B2 | * | 9/2005 | Bottom | 710/301 |
| 7,085,961 B2 | * | 8/2006 | Chang et al. | 714/13 |
| 2004/0024831 A1 | * | 2/2004 | Yang et al. | 709/208 |

FOREIGN PATENT DOCUMENTS

| | | |
|---|---|---|
| JP | 60/221863 | 11/1985 |
| JP | 03/075836 | 3/1991 |
| JP | 2002/269029 | 9/2002 |

* cited by examiner

*Primary Examiner*—Raymond N Phan
(74) *Attorney, Agent, or Firm*—James Creighton Wray; Clifford D. Hyra

(57) ABSTRACT

The present invention is carried out to provide a system controller, a control system and a system control method which are inexpensive, highly stable, capable of storing all information and past record at a time when one of the devices is down and capable of switching the devices without any time lag. The system controller comprises a bus arbiter and a non-volatile memory and has only periodically executed functions and passive functions. The system includes a bus employing a center arbitration method, from which devices can be detached from and to which the detached devices can be attached again as power being supplied. Even if one of the devices is down, processes can be immediately continued by switching from the down device to other device by utilizing the system controller and the bus.

4 Claims, 5 Drawing Sheets

SYNCHRONOUS ELECTRONIC CONTROL SYSTEM AND SYSTEM CONTROL METHOD

This application claims the benefit of PCT/JP2002/011243 filed Oct. 29, 2004, which is hereby incorporated by reference in its entirety.

BACKGROUND OF THE INVENTION

1. FIELD OF INVENTION

The present invention relates to a system controller, a control system and a system control method.

2. RELATED BACKGROUND ARTS

It has been a known technology to raise a reliability of a system in which a plurality of CPUs are arranged such that when one of the CPU is down, the other CPU is started without interrupting operations of the system. Such technology is disclosed, for example, in Japanese laid open patent No. 5-134932.

Hereinafter an outline of the disclosed technology is described as referring to FIG. 5.

FIG. 5 is a block diagram illustrating the outline of the disclosed technology.

A reference numeral "1" is a first CPU board, "2" is a second CPU board, "10" is a common bus, "11" is a CPU, "12" is an arbiter to arbitrate between an access requirement from the CPU 11 and an access requirement from a CPU 21, "13" and "14" are bus gates for determining flowing directions of data under the control of the arbiter 12, "15" is an error detection circuit for monitoring errors in one of the CPUs presently accessing to a memory, "16" is a memory for storing processed data, "17" is an internal bus, "18" is a ready state monitoring circuit, "21" is the CPU, "22" is an arbiter, "23" and "24" are bus gates, "25" is an error detection circuit, "26" is a memory, "27" is an internal bus and "28" is a ready state monitoring circuit.

The first CPU board 1 comprises the CPU 11, the arbiter 12, the bus gates 13 and 14, the error detection circuit 15 and the memory 16, and the second CPU board 2 comprises the same components as those of the first CPU board 1.

The first CPU board 1 and the second CPU board 2 are arranged via the common bus 10 such that if an error is detected when the memory 16 of the first CPU board 1 is accessed, the arbiter 12 controls the bus gates 13 and 14 so as to assign the access right to the second CPU board 2.

In addition to the above-described technology, other technology to utilize a reflect memory as a common memory, which can be accessed from a plurality of CPUs, and the like have been known.

However, in the above-mentioned technologies, since the access right is switched in accordance with the detected error in one CPU by the error detection circuit, there is a brief time lag from a time when the error is caused to a time when the error is detected and the access right is switched to the other CPU board. Sometimes problems are caused due to such time lag.

For example, if a CPU is down while processing data and writing processed data in a memory, the processed data by the CPU are lost and only data written in the memory remain. Since an accident that the CPU is down is detected after the brief time lag, it is difficult to judge to what extent the processed data are stored in the memory. Therefore, after the memory is returned a prior state before processing, the other CPU must be started working for processing and writing data from scratch. Alternatively, the other CPU must be started so as to succeed to processed data by the down CPU, after judging to what extent the data remain in the memory as checking the data written in the memory.

Due to such time lag, it takes time to process data and a highly complicated function to switch the CPU from down one to the other is required. Further, in order to avoid such drawbacks a complicated system or software with high performance is required, so that a considerable amount of costs are required or a stability of the system must be sacrificed.

When a plurality of CPUs are employed, the reflect memory, which is expensive, must be employed as the common memory for the CPUs so that further costs are required.

The present invention is carried out in view of the above-mentioned problems in order to provide an inexpensive, highly stable system controller, a control system and a system control method capable of storing all information and past record when one of the CPUs is down and capable of switching the access right without any time lag.

SUMMARY OF THE INVENTION

Hereinafter, technical substance of the present invention is disclosed.

(1) A control system comprising: a system controller comprising a bus arbiter and a non-volatile memory and having only periodically executed functions and passive functions; a bus employing a center arbitration method, from which devices can be detached and to which the detached devices can be attached again as power being supplied; and a plurality of CPU boards which execute the same processes synchronously, as devices arranged on the bus, wherein: the system controller control the system to continue processes only by periodically executed functions and passive functions of a hardware structure of the system such that when one of the CPU boards on the bus is down while accessing to the non-volatile memory, the system controller assigns the right to use the bus to other CPU board according to a requirement from the other CPU board; and even if one of the CPU board is down, the system is restored by detaching the down CPU board from the bus and attaching the CPU board to the bus again as power for the whole system being supplied.

(2) The system controller according to (1) further comprising a duplex power source system having a plurality of power sources, wherein: even if one of the CPU boards or power sources is down, the system is restored by detaching the down CPU board or the down power source from the bus and attaching the detached CPU board or the detached power source to the bus again as power for the whole system being supplied.

(3) The system controller according to (2) further comprising a duplex IO board system having a plurality of IO boards, wherein: the system controller control the system to continue processes only by periodically executed functions and passive functions of the hardware structure of the system such that when one of the CPU boards or one of the IO boards on the bus is down while accessing to the non-volatile memory, the system controller assigns the right to use the bus to other CPU board or other IO board of the duplex IO board system according to a requirement from the other CPU board or the other IO board; and even if either one of the CPU boards, the IO boards or the power sources is down, the system is restored by detaching the down CPU board, down IO board or down power source from the bus and attaching the detached device to the bus again as power for the whole system being supplied.

(4) A system control method for controlling a control system, the control system comprising: a system controller comprising a bus arbiter and a non-volatile memory and having only periodically executed functions and passive functions; a bus employing a center arbitration method from which devices can be detached or to which the detached devices can be attached again as power being supplied; and a plurality of CPU boards which execute the same processes synchronously as devices arranged on the bus, wherein: when one of the CPU boards on the bus is down while accessing to the non-volatile memory, the system controller assigns the right to use the bus to other CPU board according to a requirement from the other CPU board so as to continue processing; and the control system is restored by detaching the down CPU board from the bus and attaching the detached CPU board to the bus again as power for the whole system being supplied.

PREFERRED EMBODIMENT BY THE PRESENT INVENTION

Embodiments by the present invention are explained in detail as referring to drawings.

Embodiments by the present invention are explained as referring to FIGS. 1 to 4.

Figure 1:
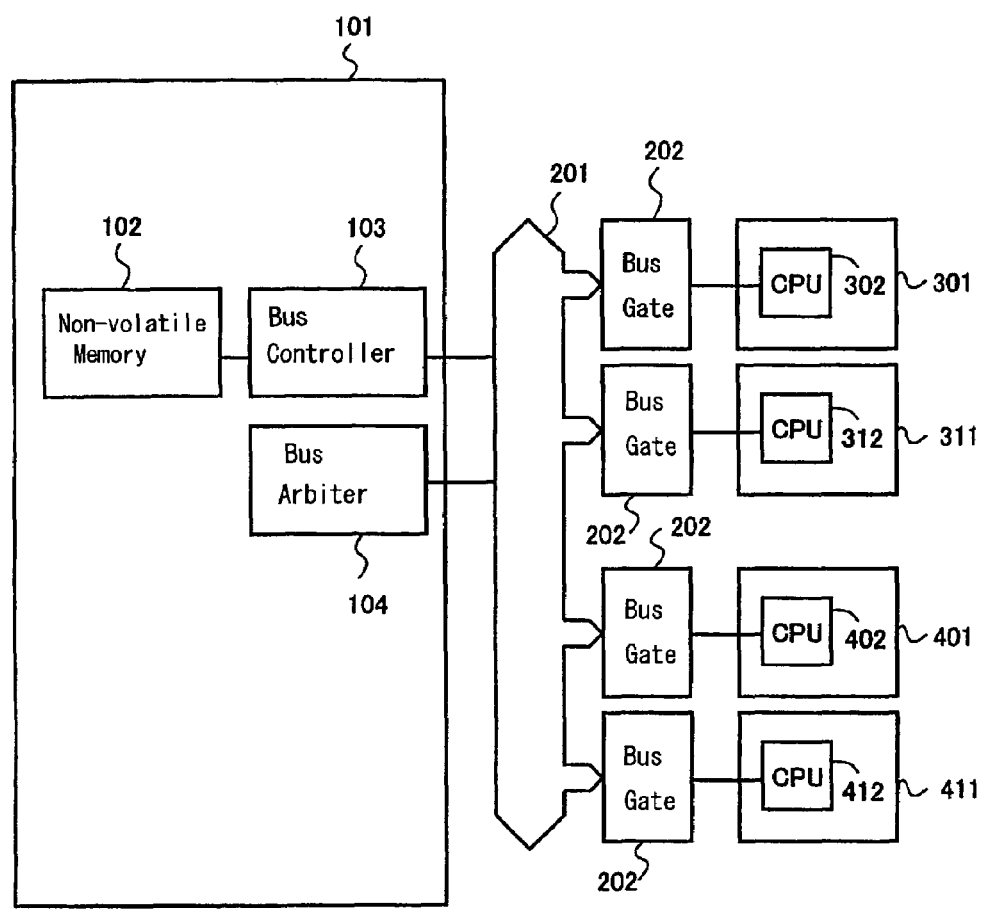
FIG. 1 is a block diagram illustrating a rough constitution of the control system by the present invention.

FIG. 1 is the block diagram illustrating the rough constitution of the control system by the present invention.

In FIG. 1, a reference numeral "101" is a system controller having only periodically executed functions and (passive) functions such as sending clock signals, a bus arbiter, sending reset signals, sending IDSEL (Initialization Device Select) signals and the like, "102" is a non-volatile memory such as an SRAM or the like which can be accessed from devices on a common bus 201, "103" is a bus controller, "122" is a bus arbiter which arbitrates access requirements from the devices (regardless of CPU boards or IO boards) and assigns the right to use the common bus to either one of the devices so that the assigned device accesses to the non-volatile memory 102. The bus arbiter 122 may be monolithically arranged with the bus controller 103.

A reference numeral "201" is a common bus such as a PCI (Peripheral Component Interconnection) bus a compact PCI bus or the like, which employs a center arbitration method and from which devices can be detached and to which devices can be attached again as power being supplied, "202" is bus gates, "301" is a first CPU board, "302" is a CPU, "311" is a second CPU board, "312" is a CPU, "401" is a first IO board, "402" is a CPU, "411" is a second IO board and "412" is a CPU.

In the present embodiment the system controller 101 is arranged on the common bus 201. The system controller 101 comprises the non-volatile memory 102, the bus controller and the bus arbiter 122 used as common resources.

Since the common bus 201 employs the center arbitration method and devices can be detached from and attached to the common bus 201 again as power being supplied, a system environment required for realizing a continuous operation, i.e. a non-stop control can be arranged by functions of a hardware structure constituted by the system controller 101 and the common bus 201.

Usually reasons why systems are down are attributed to software while executing complicated operations, but such systems can be highly stabilized by a system environment for realizing non-stop operations attained by the functions of the above-mentioned hardware structure.

On the common bus 201, the CPU boards 301, 311 and the IO boards 401, 411 are constituted via the bus gates 202.

Respective CPUs 302, 312 on the CPU boards 301, 311 execute the same processes synchronously, and either the CPU 302 or the CPU 312 is assigned the right to use the common bus 201 by the bus arbiter 122 so that the assigned CPU accesses to the non-volatile memory 102 and reflects the processed results to the memory. The same processed results by the unassigned CPU are outputted, but not reflected.

In other words, the unassigned CPU executes the so-called dummy operations, and repeatedly requests the bus arbiter 122 to assign the right to use the common bus 201, but is refused.

However, the moment either one of the CPUs 301, 302 is down, the bus arbiter assigns the right to use the common bus 201 to the other CPU which can access to the non-volatile memory 102 in which information and past record up to a time when the CPU is down, are stored. Thus processes are continued without interruption.

In this situation, since the non-volatile memory 201 can be accessed by either one of the CPUs 302 or 312 in the same manner and since the CPUs 301, 312 execute the same processes synchronously, the right to use the common bus can be switched without any time lag.

The CPU board equipped with the down CPU can restored by detaching the board and attaching the detached CPU board to the common bus afterward.

Since power can be kept supplying while detaching and attaching the down board, only small amounts of man-hours and costs for maintenance are required.

Hereinafter the system controller is explained in detail as referring to FIG. 2.

Figure 2:
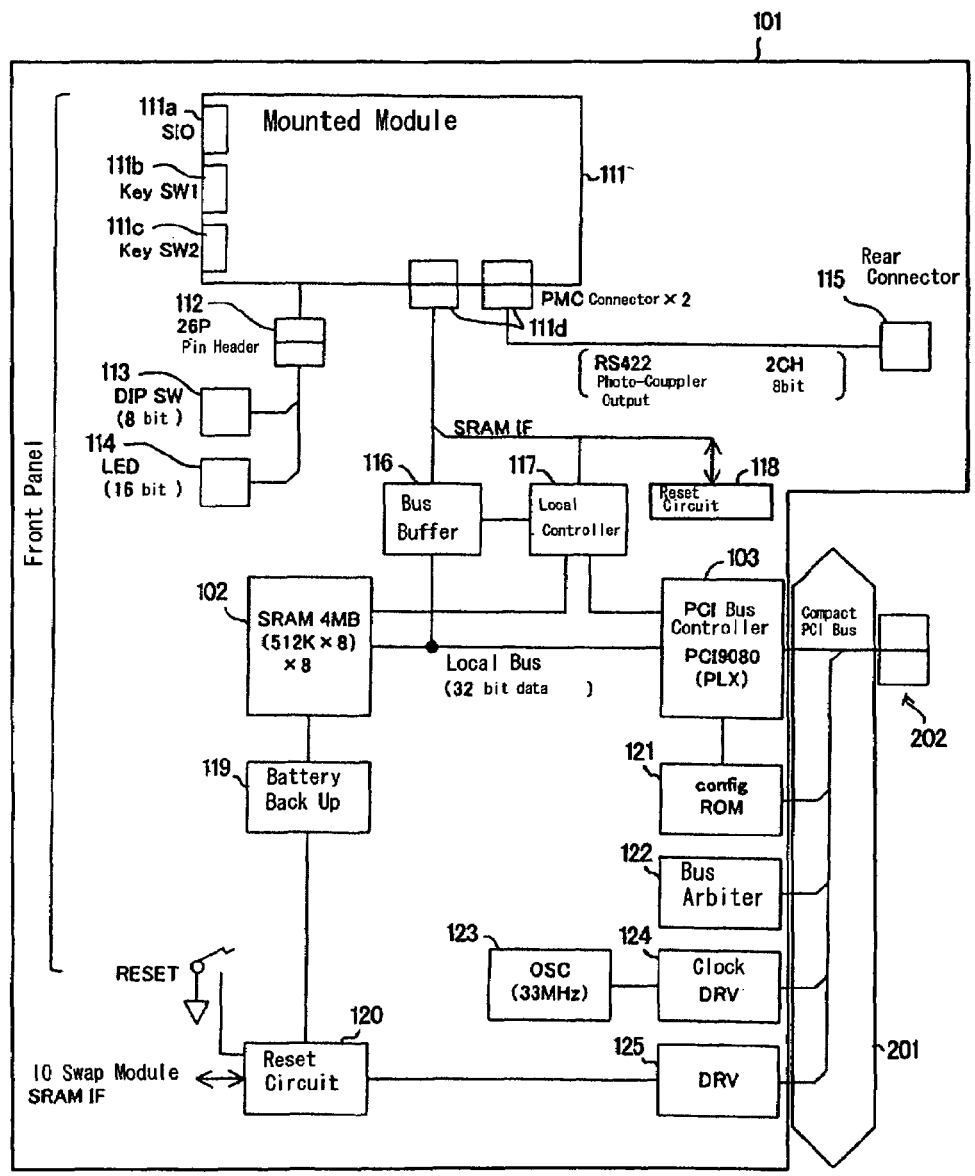
FIG. 2 is a block diagram illustrating a constitution of the system controller in an embodiment by the present invention.

FIG. 2 is the block diagram illustrating the constitution of the system controller in the embodiment by the present invention.

A reference numeral "111" is a module mounted on the system controller, "111*a*" is a SIO (Special IO unit), "111*b*" is a key switch 1, "111*c*" is a key switch 2, "111*d*" is PMC (PCI Mezzamine Card) connectors, "112" is a pin header with 26 pins, "113" is a dip switch, "114" is an LED, "115" is a rear connector, "116" is a bus buffer, "117" is a local controller, "118" is a reset circuit, "119" is a battery backup, "120" is a reset circuit, "121" is a configROM, "123" is an OCS (Oscillator), "124" is a clock DRV (Drive) and "125" is a DRV (Drive).

For example, in the present embodiment, an SRAM is employed as the non-volatile memory 102, a PCI bus controller is employed as the bus controller 103 and a compact PCI bus is employed as the common bus 201.

The system controller 101 is a system controller having only periodically executed functions as a passive RAS (Remote Access Service) and passive functions, and comprising the non-volatile memory 102 such as the SRAM or the like equipped with the battery backup 119. Thus, even if either one of the CPU boards is down or detached from the common bus, data which should be commonly owned by the CPU boards can be maintained by storing the data in the non-volatile memory 102.

By restricting functions of the system controller 101 to the periodically executed functions and passive functions such as a function to transmit clock signals, a function of the bus arbiter, a function to transmit reset signals, a function to transmit IDSEL signals and the like, the system controller 101 is stabilized so that the whole control system can be stabilized.

A plurality of devices such as the CPU boards, the IO boards and the like may be arranged in the common bus 201 via the bus gates 202.

Hereinafter, the non-stop control system by the present invention is explained as referring to FIG. 3.

Figure 3:
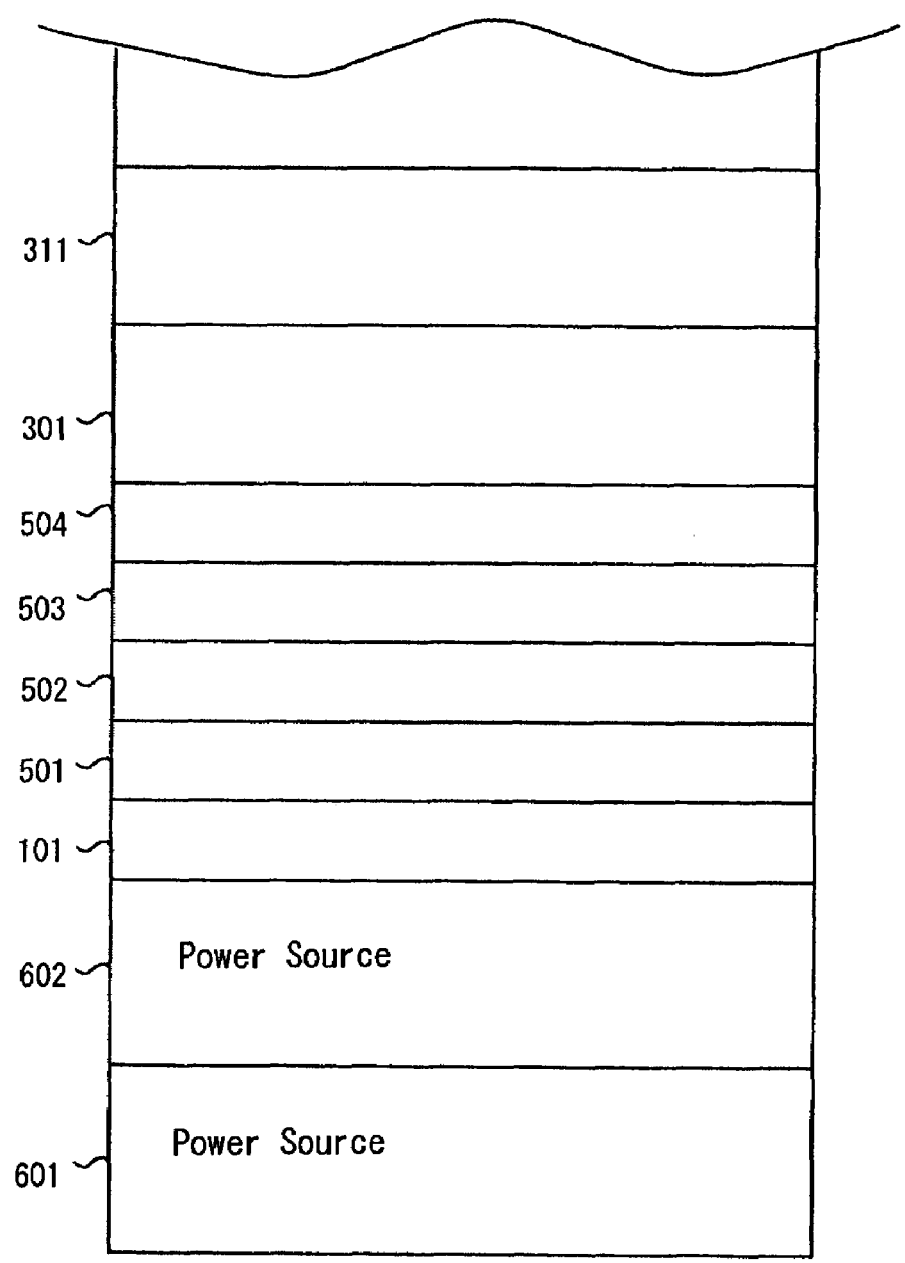
FIG. 3 is a chart illustrating a non-stop control system by the present invention.

FIG. 3 is the chart illustrating the non-stop control system by the present invention.

Reference numerals "501", "502", "503" and "504" are IO boards and "601", "602" are power sources such as hot-swap power sources or the like. The power sources 601 and 602 constitute a duplex power source system.

Universal CPU boards for personal computers can be employed as the CPU boards 301, 311. By employing, for example, a PCI bridge chip 21554 called an embedded bridge as a PCI bridge, the non-stop control system can support an operation for detaching devices from and attaching the detached devices to the common bus again (hereinafter also referred as "Hot-Swap") as a standard operation as power being supplied.

LAN and IDE (Integrated Drive Electronics) may be employed for inputting data to and outputting data from the CPU boards 301, 311 by utilizing a ROM in which an operating system is stored. A hard disk drive may be employed instead.

The CPU boards 301, 311 have piggy pack connectors (not shown) to which LAN cards can be added when a duplex LAN system is required.

It is not necessary to employ the CPU boards 301, 311 of high performance for the non-stop control system, but the CPU boards may be converted into an ultra high speed parallel processing system by employing a board equipped with a dual processor or the like which runs the CPU boards in parallel.

In stead of accessing to the IO boards 501 to 504 directly from the CPU boards 301, 302, a carry of an IP module may be arranged so as to transfer data accessed by a processor exclusively used for controlling the IO boards to a memory designated beforehand as the whole system being synchronized.

The duplex power sources 601, 602 are already put to practical use. The CPU boards 301, 311 may have respective HDDs or the like as far as data stored in the HDDs are common.

As the control system is arranged in the above-mentioned way, a non-stop control system which runs the system controller 101 and a plurality of devices comprising the CPU boards 301, 311, the IO boards 501 to 504 and the duplex power system comprising power sources 601, 602, can be realized. And the Hot-Swap makes it possible to reduce costs for maintaining the system to a larger extent.

Further, power sources, CPUs and IO controllers for general-purpose use, namely, open systems can be used by employing a general-purpose bus such as the compact PCI bus or the like. Since these general-purpose devices can be Hot-Swapped, being daily improved devices such as the CPU boards and the like with high quality can be employed as required so that a control system with a high flexibility and the easy maintenance of the system can be realized.

Hereinafter, the system control method is explained as referring to FIG. 4.

Figure 4:
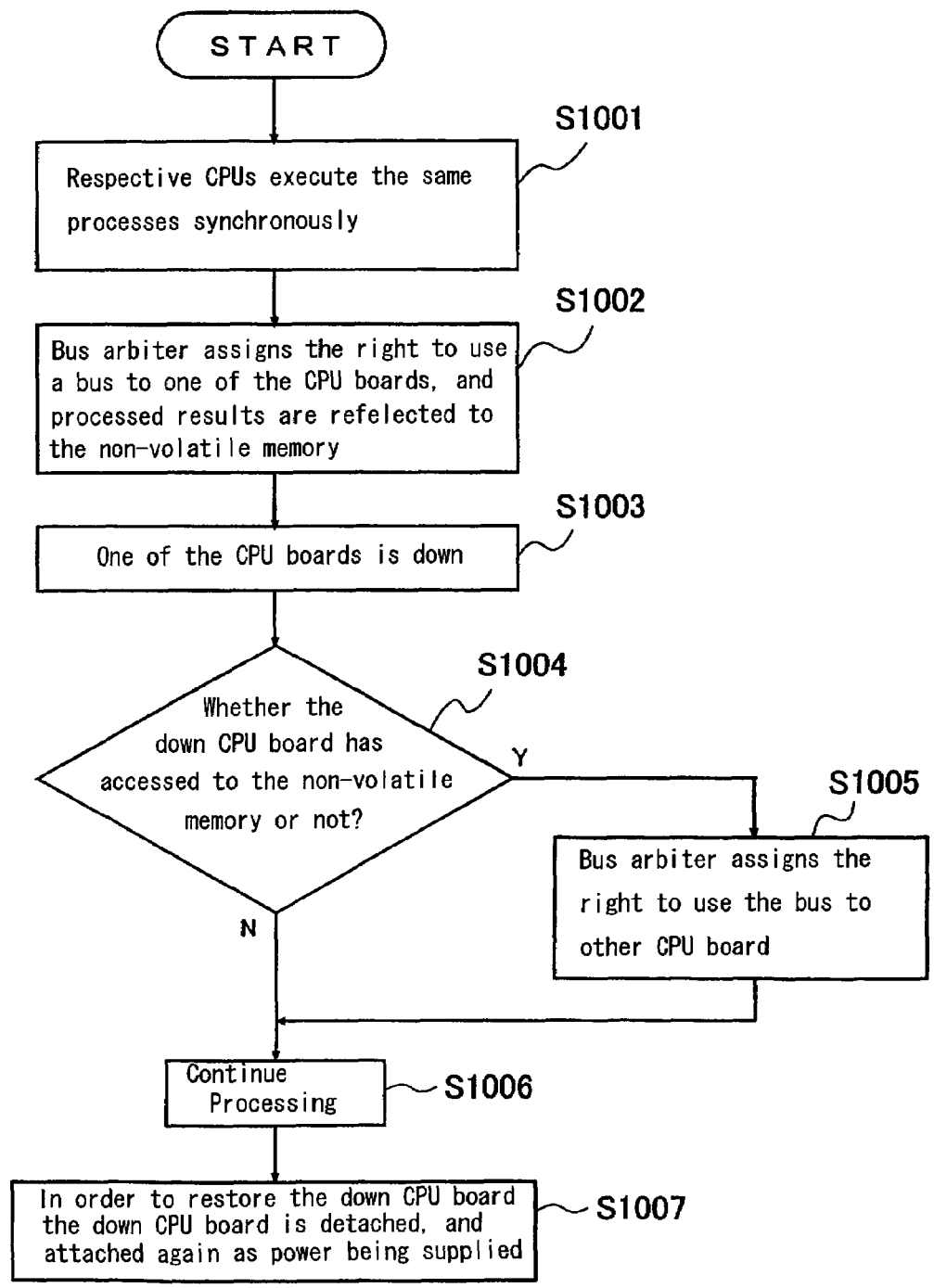
FIG. 4 is a flow chart illustrating a system control method by the present invention.
Figure 5:
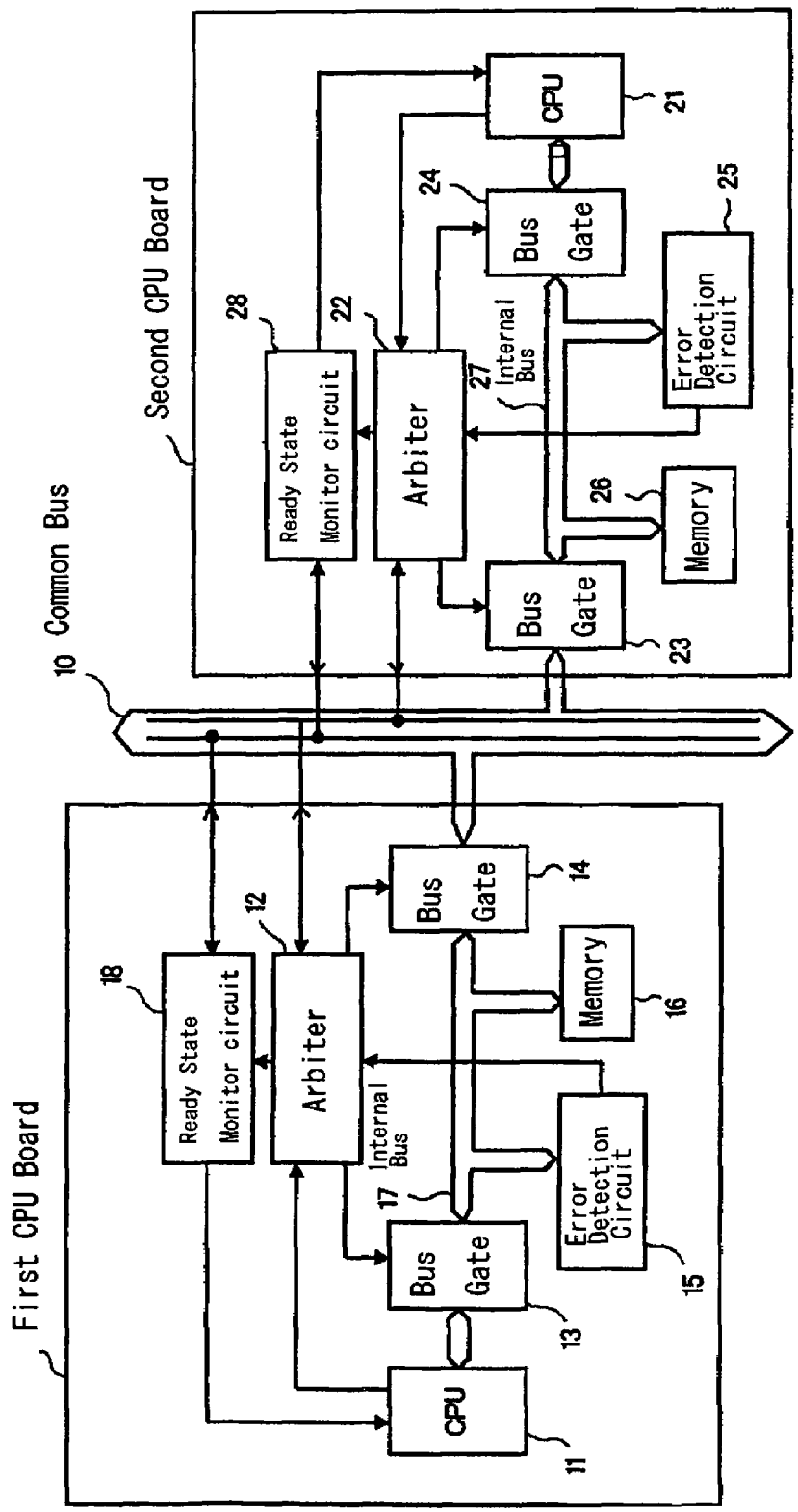
FIG. 5 is the block diagram illustrating the conventional art.

FIG. 4 is the flow chart illustrating the system control method by the present invention.

When the control system is started, the respective CPUs 302 and 312 execute the same processes synchronously at step S1001.

At step S1002, the bus arbiter 122 assigns the right to use the common bus 201 to either one of the CPU boards 301, 311 and processed results by the assigned CPU board are reflected to the non-volatile memory.

At step S1003, either one of the CPU board 301 or 312 is down due to a caused error in the CPU board.

At step S1004, whether the down CPU board has accessed to the non-volatile memory 102 or not is judged.

If the down CPU board has not accessed to the memory, the control system runs without interruption (step S1006).

If the down CPU board has accessed to the memory, and since the down CPU board has not use the common bus 201 anymore, the bus arbiter 122 immediately assigns the right to use the common bus 201 to the other CPU board (step 1005) so that the processed results by the assigned CPU board are reflected to the non-volatile memory 102 without any time lag.

Thus the control system continues its processes (step S1006).

Later at step S1007, the down CPU board including the down CPU is detached from the system and the detached CPU board is attached to the system again (Hot-Swap), so that the system is restored.

In the above-mentioned way, not only a highly stable non-stop control capable of being continuously operated limitlessly can be realized, but also costs for maintaining the system can be remarkably reduced.

The present method is explained with respect to the CPU boards, but it can be applied to the IO boards and other devices in the same way.

POSSIBILITIES OF INDUSTRIAL USE

Consequently, the present invention can provide the system controller, the control system and the system control method which are inexpensive, highly stable, capable of storing all information and past record and capable of switching the devices without any time lag.

By employing the center arbitration method and the bus capable of swapping the down devices as power being supplied, a system control method capable of storing all information and past record at a time when the device is down, capable of switching the devices without any time lag and capable of reducing the maintenance costs remarkably can be realized.

Further a stable control system with high performance can be realized by utilizing the open system.

What is claimed is:

1. A control system comprising:
   a system controller comprising a bus arbiter and a non-volatile memory and having only periodically executed functions and passive functions;

a bus employing a center arbitration method, wherein a single bus arbiter is connected to a plurality of CPUs via the bus, from which devices can be detached and to which the detached devices can be attached again as power being supplied; and a plurality of CPU boards which execute the same processes synchronously, as devices arranged on said bus, wherein:

said system controller control the system to continue processes only by periodically executed functions and passive functions of a hardware structure of the system such that when one of said CPU boards on said bus is down while accessing to said non-volatile memory, said system controller assigns the right to use said bus to other CPU board according to a requirement from said other CPU board; and even if one of the CPU boards is down, the system is restored by detaching said down CPU board from said bus and attaching said detached CPU board to said bus again as power for the whole system being supplied.

2. The control system according to claim 1 further comprising a duplex power source system having a plurality of power sources, wherein:

even if one of the CPU boards or power sources is down, the system is restored by detaching said down CPU board or said down power source from said bus and attaching said detached CPU board or said detached power source to said bus again as power for the whole system being supplied.

3. A control system comprising:

a system controller comprising a bus arbiter and a non-volatile memory and having only periodically executed functions and passive functions;

a bus employing a center arbitration method, wherein a single bus arbiter is connected to a plurality of CPUs via the bus, from which devices can be detached and to which the detached devices can be attached again as power being supplied; and a plurality of CPU boards which execute the same processes synchronously, as devices arranged on said bus, wherein:

said system controller control the system to continue processes only by periodically executed functions and passive functions of a hardware structure of the system such that when one of said CPU boards on said bus is down while accessing to said non-volatile memory, said system controller assigns the right to use said bus to other CPU board according to a requirement from said other CPU board; and even if one of the CPU boards is down, the system is restored by detaching said down CPU board from said bus and attaching said detached CPU board to said bus again as power for the whole system being supplied, further comprising a duplex power source system having a plurality of power sources, wherein even if one of the CPU boards or power sources is down, the system is restored by detaching said down CPU board or said down power source from said bus and attaching said detached CPU board or said detached power source to said bus again as power for the whole system being supplied, further comprising a duplex IO board system having a plurality of IO boards, wherein:

said system controller control the system to continue processes only by periodically executed functions and passive functions of the hardware structure of the system such that when one of said CPU boards or one of said IO boards on said bus is down while accessing to said non-volatile memory, said system controller assigns the right to use said bus to other CPU board or other IO board of said duplex IO board system according to a requirement from said other CPU board or said other IO board; and even if either one of the CPU boards, the IO boards or the power sources is down, the system is restored by detaching said down CPU board, down IO board or down power source from said bus and attaching said detached device to said bus again as power for the whole system being supplied.

4. A system control method for controlling a control system, said control system comprising:

a system controller comprising a bus arbiter and a non-volatile memory and having only periodically executed functions and passive functions;

a bus employing a center arbitration method from which devices can be detached and to which the detached devices can be attached again as power being supplied; and a plurality of CPU boards which execute the same processes synchronously as devices arranged on said bus, wherein:

when one of said CPU boards on said bus is down while accessing to said non-volatile memory, said system controller assigns the right to use said bus to other CPU board according to a requirement from said other CPU board so as to continue processing; and said control system is restored by detaching said down CPU board from said bus and attaching said detached CPU board to said bus again as power for the whole system being supplied.

* * * * *